Dec. 21, 1943.                V. POST                2,337,412
                        MICROMETRIC TOOL HOLDER
                Filed Aug. 14, 1941         2 Sheets-Sheet 1
Fig. 1
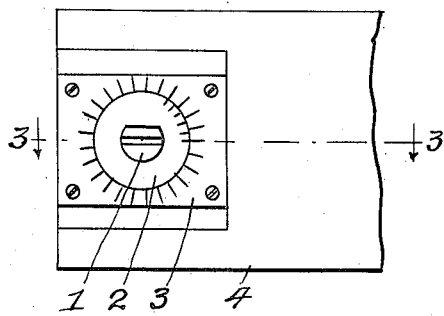
Fig. 2.
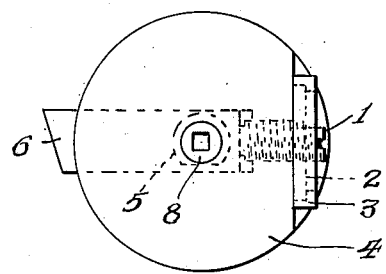
Fig. 3.
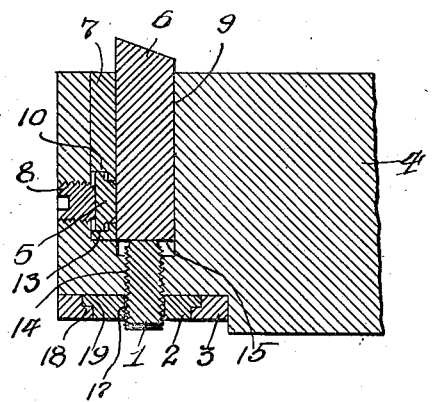
Fig. 4    Fig. 6.
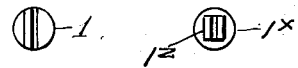 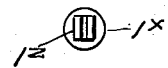
Fig. 5.    Fig. 7.
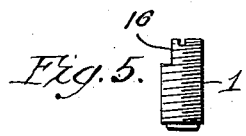 
Fig. 8.    Fig. 10.    Fig. 12.
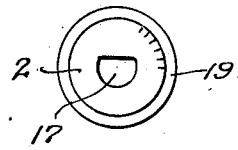 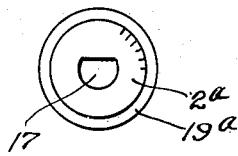 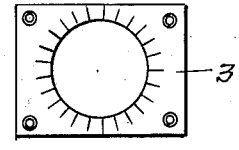
 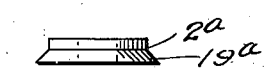 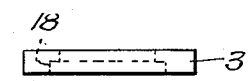
Fig. 9.    Fig. 11.    Fig. 13.
INVENTOR.
Victor Post,
BY Charles O. Shervey,
His Atty.

Dec. 21, 1943.  V. POST  2,337,412
MICROMETRIC TOOL HOLDER
Filed Aug. 14, 1941  2 Sheets-Sheet 2
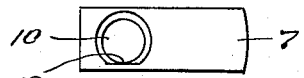
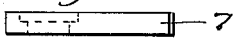
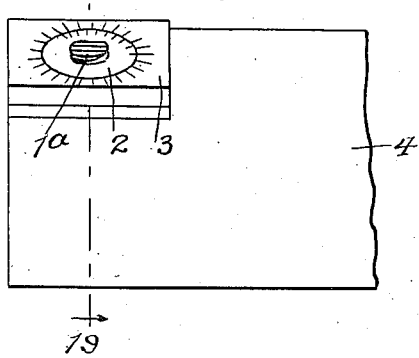
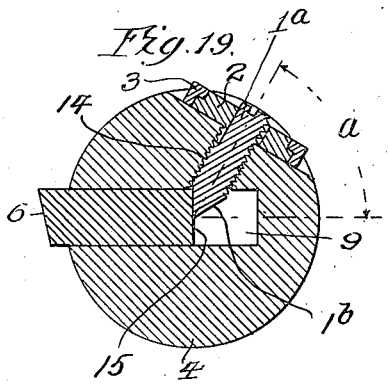
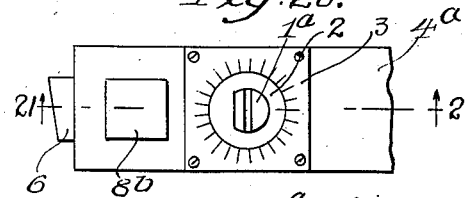
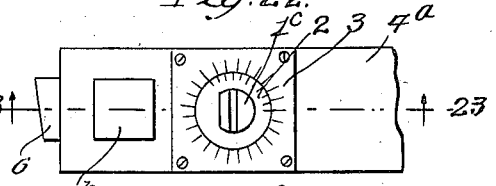
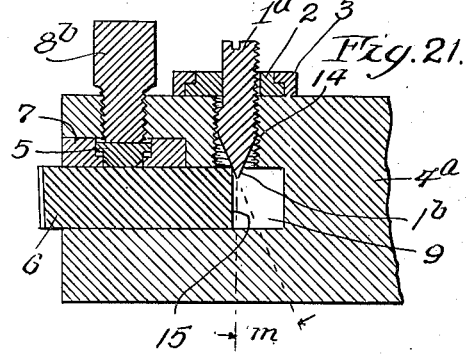
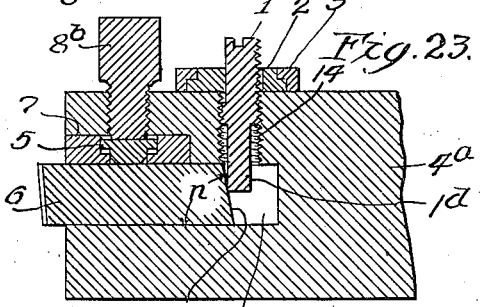
INVENTOR.
Victor Post,
BY Charles O. Shurvey,
His Atty.

Patented Dec. 21, 1943

2,337,412

UNITED STATES PATENT OFFICE 2,337,412

MICROMETRIC TOOLHOLDER

Victor Post, Chicago, Ill.

Application August 14, 1941, Serial No. 406,821

6 Claims. (Cl. 77—58)

This invention has close relation to tool holders in general, and, mainly, to tool holders used in the metal working industry.

The main object of my invention is to provide a tool holder which permits close and precise control of the feed of the tool bit into the work. Tool holders existing now for this purpose do not possess the desirable precision, and the feeding of the cutting point of the tool bit on many types of machinery is accomplished by hand or by try and cut method. These methods require excessie amount of time and, inevitably, large quantities of spoiled work.

The new features of this invention may be stated as follows:

(1) The tool holder embodies a specially designed micrometer head which regulates the feed of the cutting point of the tool bit to any desired degree of precision up to .000001 of an inch;

(2) The micrometer screw, when used, is always in close contact with the tool bit without any intermediary contrivances;

(3) The means by which the micrometer screw transmits only a fraction of its motion of translation to the cutting point of the tool bit;

(4) The means by which the tool bit is fastened in desired position without distortive influence of the rotative forces generated by a set screw when the latter is used alone.

The invention is clearly illustrated in the drawings accompanying this specification, in which:

Fig. 1 is a side elevation of an ordinary round boring bar (partly broken away) used on lathes, turret lathes, boring mills and other machinery and embodying one form of the present invention.

Fig. 2 is an end elevation of the boring bar seen in Fig. 1.

Fig. 3 is a vertical axial section of the boring bar, taken on line 3—3 of Fig. 1.

Fig. 4 is a plan and Fig. 5 is a side elevation of the micrometer screw.

Fig. 6 is a plan and Fig. 7 is a side elevation of a slightly modified form of micrometer screw.

Fig. 8 is a plan and Fig. 9 is a side elevation of the rotating micrometer dial.

Fig. 10 is a plan and Fig. 11 is a side elevation of a slightly modified form of rotating micrometer dial.

Fig. 12 is a plan and Fig. 13 is a side elevation of the stationary micrometer dial.

Fig. 14 is a plan and Fig. 15 is a side elevation of a clamp block used for clamping the tool bit in place.

Fig. 16 is a plan and Fig. 17 is a side elevation of a certain plate used in connection with the clamp block.

Fig. 18 is a side elevation of a slightly modified form of the invention.

Fig. 19 is a vertical cross section of the boring bar seen in Fig. 18, taken on line 19—19 of Fig. 18.

Fig. 20 is a plan of a second modification applied to a straight shank tool holder, used on lathes, shapers and other machinery.

Fig. 21 is a vertical longitudinal section of the tool holder seen in Fig. 20, taken on line 21—21 of Fig. 20.

Fig. 22 is a plan of a third modification.

Fig. 23 is a vertical longitudinal section of the tool holder seen in Fig. 22 taken on line 23—23 of Fig. 22.

Referring to said drawings, and first to Figs. 1 to 17, the boring bar body 4 (Figs. 1, 2 and 3) has a transversely extending hole 9 for the reception of a tool bit 6. The tool bit may be square in cross section, with ground sides, with the rear part 15 of tool bit ground square; the front part is ground as a cutting point. The tool bit must closely fit in the hole in which it is inserted; this hole must be of dimensions such as to permit the insertion of the tool bit and the hereafter described part 7 (as shown on Fig. 3).

The part 7 is a small metal plate (see Figs. 16 and 17) with a hole 10 therein which serves for insertion of a small metal clamp block 5 in it. The plate 7, with the clamp block 5 inserted in it, is fixed to the tool holder (by brazing, soldering or other means) on the side of the hole for the tool bit, as shown on Fig. 3. Due to corresponding segmental flat surfaces 11 and 12 of the parts 5 and 7, part 5 cannot rotate, when inserted in the hole of the part 7, but it may have slight motion of translation, because the upper portion 13 of the part 5 is slightly thinner than the corresponding portion of the hole in the part 7. Parts 5 and 7 are shown in Figs. 14, 15, 16 and 17; when assembled and fastened in the tool holder they are shown on Fig. 3. A set screw 8, threaded in the body 4, bears against the clamp block. When the inserted tool bit is fastened by the set screw, the latter can transmit to the clamp block 5 only slight motion of translation which is transformed into a pressure on the tool bit through the clamp block. In this way the undesirable influence of the rotative force of the set screw is eliminated.

The body of the tool holder has a micrometer head embodied in it. As may be seen from Figs. 1, 2 and 3, the micrometer head consists of three parts: (1) the micrometer screw 1, (2) the revolving dial 2, with vernier divisions on it and (3) the stationery dial 3, with divisions on it according to the pitch of the micrometer screw.

A tapped hole 14 in the body of the tool holder serves as a nut for the micrometer screw, which is shown separately in Figs. 4 and 5. The rotating dial is shown separately in Figs. 8 and 9, and the stationary dial is shown separately in Figs. 12 and 13.

The outer end of the micrometer screw (Fig. 5) has a slot for a screw driver, by which the micrometer screw is moved in and out. In its inward motion the micrometer screw presses against the rear surface 15 of the tool bit and forces it to move forward. The amount of this forward motion is regulated by the corresponding micrometer readings. The micrometer screw rotates the rotating dial 2; this is due to a flat segmental surface 16 on the part of the micrometer screw which extends through a corresponding hole 17 in the center of the rotating dial (Figs. 5 and 8). This end of the screw is free to slide through the hole in the rotating dial. Instead of the flat segmental surfaces on the micrometric screw and rotating dial, the micrometric screw 1ˣ may be made square part way along the length as at 1ᶻ (Figs. 6 and 7) for engagement in a square hole in the rotating dial.

The stationary dial indicated by 3 in Figs. 1, 2 and 3, has an undercut hole 18 which serves as a seat for the revolving dial which is flanged as seen at 19. If desired the flange may be tapered as seen at 19ᵃ in Figs. 10, 11 on the rotating dial 2ᵃ. The revolving dial is inserted in this hole and when the micrometer screw is sufficiently screwed in the threaded hole, then the stationary dial 3 is fixed to the body of the tool holder by four small screws, as shown on Fig. 1. By this arrangement the rotating dial together with micrometer screw revolves inside the hole of the fixed dial. The rotating dial has only motion of rotation, whereas the micrometer screw has both motion of rotation and motion of translation. Preferably the fixed dial has micrometer divisions on it, while the rotating dial has vernier divisions on it. In this way the micrometer readings may be taken easily. Either dial may have one or more divisions on it.

A higher degree of precision in micrometer and vernier readings may be reached, when the propulsive force of the micrometric screw acts on the tool bit at a certain conveniently chosen angle. This is accomplished either by forming a selected angle between the axis of the micrometric screw and the axis of the tool bit, at angle $a$ as shown in Fig. 19, or by grinding the lower end of the micrometric screw to a certain angle at its inverted apex as shown at angle $m$ in Fig. 21, or by grinding the rear surface 15ᶜ of the tool bit at a certain bilateral angle, as shown at angle $n$ in Fig. 23. In Figs. 19 and 21 the effective end of the micrometric screw is cone shaped as seen at 1ᵇ and in Fig. 23 it is cylindrical as seen at 1ᵈ.

In the modified form illustrated in Figs. 18 and 19 the micrometric screw 1ᵃ extends at an oblique angle to the axis of the tool bit 6 with its conical end 1ᵇ bearing against the end face 15 of the tool bit. In other respects the construction is substantially the same as that shown in Figs. 1 to 17 inclusive.

In the modified form illustrated in Figs. 20, 21, the invention is shown applied to a straight shank tool holder 4ᵃ. The micrometric screw 1ᵃ extends at right angles to the axis of the tool bit 6 with its conical end 1ᵇ engaging the rear end 15 of the tool bit at one corner thereof. The set screw 8ᵇ is slightly different from the one shown in Figs. 2 and 3 but in other respects the construction of the parts is substantially the same as that of the form shown in Figs. 1 to 17.

The modified form illustrated in Figs. 22, 23 is substantially the same as that shown in Figs. 20, 21, except that the micrometric screw 1ᶜ has a cylindrical end 1ᵈ that bears against the inclined end face 15ᶜ of the tool bit.

Only a few illustrative examples are given above, but many other modifications are possible, utilizing the principles above set forth, without departure from the spirit and scope of the invention as defined in the subjoined claims.

I claim as new and desire to secure by Letters Patent:

1. The combination, in a tool holder, of a stationary dial mounted on the body of the tool holder, a rotating dial mounted on said body for rotation but held against axial movement, and having a non-circular hole in it located about centrally of it, and a micrometric screw, one end of which extends slidingly through said hole and is shaped to correspond with said hole, whereby the dial rotates with the screw, said screw being threadedly mounted in a threaded bore in the body, with one end disposed in position to engage the rear end of a tool bit contained in a hole in said body.

2. The combination, in a tool holder, of a stationary dial fixed on the body of the tool holder and having a recessed round hole in it, a revolving dial, shaped to fit said recessed hole and having a non-circular hole located about centrally of it, a micrometric screw, one end of which is shaped to fit said noncircular hole and extends slidingly through it; the micrometric screw being threaded in a bored and threaded hole in the body of the tool holder with its other end extending into a hole in said body and adapted to engage the the rear end of a tool bit contained therein, the tool bit being coaxial with the micrometric screw.

3. The combination, in a tool holder, of a stationary dial fixed on the body of the tool holder and having a recessed hole in it, a rotating dial, shaped to fit said hole and having a non-circular hole located about centrally in it, and a micrometric screw, one end of which is shaped to fit said non-circular hole and extends slidingly through it; the micrometric screw being threaded in a bored and threaded hole in the body of the tool holder, its other end extending into a hole in said body for engagement with the rear face of a tool bit, the axis of the tool bit and the axis of the threaded hole for the micrometric screw being disposed at an angle.

4. The combination, in a tool holder, of a stationary dial fixed on the body of the tool holder and having a recessed hole in it, a rotating dial, shaped to fit said hole and having a non-circular hole located about centrally in it, and a micrometric screw, one end of which is shaped to fit said non-circular hole and extends slidingly through it; the micrometric screw being threaded in a bored and threaded hole in the body of the tool holder, its other end being cone shaped and entering a hole in the body of the tool holder for the reception of a tool bit; the face of the coned end of the micrometric screw being arranged to engage the rear end of a tool bit contained in said tool bit hole.

5. The combination, in a tool holder, of a stationary dial fixed to the body of the tool holder and having a recessed hole in it, a rotating dial shaped to fit said hole and having a non-circular hole located about centrally in it, and a micrometric screw, one end of which is shaped to fit said non-circular hole, and extends slidingly through it; the micrometric screw being threaded in a bored and threaded hole in the body of the tool holder, its other end being cylindrical and extending into a hole in said body for the reception of a tool bit; said cylindrical end of the micrometric screw being arranged to engage the rear surface of a tool bit contained in said tool bit hole, said rear surface of the tool bit extending at a selected angle to the axis of the micrometric screw.

6. A tool holder having a tool bit fastening device fixed adjacent a tool bit hole in the body of the tool holder and consisting of a plate formed with a non-circular recessed hole in it, a clamp block non-removably held in and shaped to fit slidingly in said hole and arranged to bear against a tool bit contained in said tool bit hole, and a set screw threaded in the body of the tool holder in position to bear against the clamp block.

VICTOR POST.